United States Patent
Bammert et al.

(10) Patent No.: US 8,117,631 B2
(45) Date of Patent: Feb. 14, 2012

(54) PICKUP WITH ASYMMETRICALLY ARRANGED LENS FOR ACCESSING MOVING STORAGE MEDIA AND DRIVE HAVING THE PICKUP

(75) Inventors: Michael Bammert, Hardt (DE); Tsuneo Suzuki, Mönchweiler (DE); Rolf Dupper, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 307 days.

(21) Appl. No.: 12/002,735

(22) Filed: Dec. 18, 2007

(65) Prior Publication Data

US 2008/0159087 A1 Jul. 3, 2008

(30) Foreign Application Priority Data

Dec. 28, 2006 (EP) .................................. 06127296

(51) Int. Cl.
*G11B 7/08* (2006.01)
(52) U.S. Cl. .................. 720/681; 369/44.15; 369/254
(58) Field of Classification Search .................. 720/665, 720/667, 672, 676, 681, 683, 689, 701, 692, 720/684, 685, 690, 688; 369/244.1, 251, 369/254

See application file for complete search history.

(56) References Cited

U.S. PATENT DOCUMENTS

| | | | |
|---|---|---|---|
| 7,137,133 B2 * | 11/2006 | Suzuki et al. ................ | 720/683 |
| 2004/0017764 A1 * | 1/2004 | Suzuki et al. ................ | 369/244 |
| 2005/0060732 A1 * | 3/2005 | Kang et al. ................ | 720/685 |
| 2006/0143639 A1 * | 6/2006 | Ke et al. ........................ | 720/683 |
| 2006/0225087 A1 * | 10/2006 | Shimokawa et al. ......... | 720/683 |

FOREIGN PATENT DOCUMENTS

| | | | |
|---|---|---|---|
| EP | 0902423 B1 | | 7/2001 |
| JP | 04028025 A | * | 1/1992 |
| JP | 10172157 A2 | | 6/1998 |
| WO | WO 2007111034 A1 | * | 10/2007 |

OTHER PUBLICATIONS

Search report dated Aug. 16, 2007.

* cited by examiner

*Primary Examiner* — Hoa T Nguyen
*Assistant Examiner* — Mark Fischer
(74) *Attorney, Agent, or Firm* — Tutunjian & Bitetto, P.C.

(57) ABSTRACT

A pickup for accessing moving storage media carrying substantially parallel information tracks has a carrier, an actuator with a lens and suspension wires extending from the rear of the carrier and joining the carrier and the actuator. The actuator is movable in the focus direction and in a tracking direction and has a substantially rectangular flat board carrying the lens and a counter weight. The flat board is arranged orthogonal to a focus direction and carries tracking and focus coils. The pickup has a magnet configuration connected to the carrier with at least two tracking magnets, which are arranged in the tracking direction at opposite sides of the flat board and extend orthogonal to the focus direction above and/or under the flat board, and with at least two focus magnets, which are arranged in front of and behind the flat board and extend orthogonal to the direction of the tracks. According to the invention, the lens is arranged asymmetrically in reference to an axis through a center of the flat board parallel to the direction of the tracks while the lens and the counter weight are symmetrically arranged in reference to the center of the flat board.

5 Claims, 3 Drawing Sheets

PICKUP WITH ASYMMETRICALLY ARRANGED LENS FOR ACCESSING MOVING STORAGE MEDIA AND DRIVE HAVING THE PICKUP

This application claims the benefit, under 35 U.S.C. §119, of European Patent Application No. 06127296.9 on 28 Dec. 2006.

BACKGROUND OF THE INVENTION

1. Field of the Invention

The present invention is related to a pickup for accessing moving storage media according to the preamble of claim 1. Pickups are used as part of a recording and/or reproducing apparatus, e.g. of a DVD player, a DVD recorder or of similar apparatuses.

2. Description of the Prior Art

A pickup for accessing moving storage media records and/or reproduces information with respect to the moving storage media carrying substantially parallel information tracks, namely a turning disk, while moving in the radial direction of the disk.

A pickup, referred to as an objective lens actuator, which uses an actuator with a flat form, referred to as an objective lens holder, facilitates manufacturing and fabrication, is described in the US 2006/0143639. The pickup controls the focus direction, tracking direction and radial tilt direction of its optical pickup head.

The pickup comprises a carrier, constituted as a ferromagnetic yoke, a damper holder and a printed circuit, the actuator with a lens and suspension wires extending from a rear of the carrier and joining the carrier and the actuator. The actuator is constituted as a substantially rectangular flat board. The flat board is arranged orthogonal to the focus direction and carries tracking coils and focus coils. The lens is arranged on the upper side, which is directed to the disk, at the center of the flat board. A counter weight can be provided.

In addition the pickup comprises a magnet configuration connected to the carrier with four tracking magnets and two focus magnets. Two tracking magnets each are arranged at opposite sides of the flat board in the tracking direction and extend orthogonal to the focus direction above and under the flat board. The two focus magnets are arranged in front of and behind the flat board and extend orthogonal to the direction of the tracks.

The suspension wires both movably support the actuator, as well as apply currents to the coils on the actuator. The coils and the magnet configuration, all together referred to as a magnetic driving portion, initiate the movements of the actuator. The actuator is movable relatively to the carrier in the focus direction, the tracking direction and in the radial tilt direction in a plane spanned by the focus direction and by the tracking direction, respectively. By moving the actuator with the lens, the beam spot can be accurately located on the disk.

As a disadvantage can be seen, that there is a certain distance between the lens arranged at the center and the outer surfaces of the pickup. Since some driving elements are needed in the center opening of a running disk, the lens of the pickup cannot be positioned near the center of the disk. As a result, the recording and/or reproducing of data is not possible in a certain region around the center of the disk.

An additional thin pickup, referred to as an objective lens driving device, is described in the JP 101721157 A2. The device comprises tracking driving magnets and focusing driving magnets arranged around a lens holder for holding an objective lens. Projecting poles protrude toward these magnets from the lens holder and tracking driving coils and focusing driving coils are wound on these projecting poles.

This round pickup is suspended in its center. As a disadvantage, the movements of the lens in the tracking direction follow a circular arc, which is more strongly curved than that of a pickup with suspension wires. The pickup provides a lens, which is arranged in the direction of the tracks in front of the lens holder and in the tracking direction in the middle of the pickup. The pickup is also not able to record and/or reproduce data in a certain region around the center of the disk.

SUMMARY OF THE INVENTION

It is therefore desirable to improve a pickup according to the preamble of claim 1 in order to record and/or reproduce data in a certain region around the center of the disk.

According to the invention this is achieved by the features of claim 1. Possible advantageous developments of the invention are specified in the dependent claims.

A pickup for accessing moving storage media carrying substantially parallel information tracks has a carrier, an actuator with a lens and suspension wires joining the carrier and the actuator. The actuator is movable in a focus direction and in a tracking direction. It has a substantially rectangular flat board carrying the lens and a counter weight. The flat board is arranged orthogonal to the focus direction and carries tracking coils and focus coils.

The suspension wires are arranged substantially parallel and are oriented in the direction of the information tracks being scanned on the media and extend from a rear, typically from a holder, of the carrier to the flat board. They are arranged symmetrically in reference to the flat board and are soldered at opposite sides of the flat board.

The pickup has a magnet configuration connected to the carrier with at least two tracking magnets and with at least two focus magnets. The tracking magnets are arranged at opposite sides of the flat board in the tracking direction and extend orthogonal to the focus direction above and/or under the flat board. The focus magnets are arranged in front of and behind the flat board and extend orthogonal to the direction of the tracks. In other words, the focus magnets are arranged at opposite sides, the rear and the front, of the flat board in the direction of the tracks. The rear of the flat board is directed to the rear of the carrier. A front focus magnet is arranged in front of the flat board and a rear focus magnet is arranged at the rear of the flat board, namely between the rear of the carrier and the flat board.

According to the invention the lens is arranged asymmetrically in reference to an axis through a center of the flat board parallel to the direction of the tracks while the lens and the counter weight are symmetrically arranged in reference to the center of the flat board. In other words, the counter weight is symmetrically arranged at a diagonal line extending from the lens through the center of the flat board to the counter weight.

An asymmetrically arranged lens is located near the outer surface of the pickup at one side of the flat board in the tracking direction. As a result, a pickup of the invention can record and/or reproduce data near the center of the disk.

Preferably, the lens is arranged at a front corner of the flat board, namely a corner at the front of the flat board which is opposite to the rear of the carrier.

Advantageously, longer sides of the flat board can be arranged parallel to the tracking direction, between the focus magnets while side parts of the flat board can project from the focus magnets at both sides. The lens can be arranged in front of one of the side parts next to a front focus magnet. Preferably, the tracking magnets can be arranged in the region of the side parts of the flat board.

Advantageously, the tracking magnets can be arranged on a base of the carrier under the flat board, while side arms of the base arranged over the flat board constitute yokes for the tracking magnets.

Preferably a moving storage media drive is provided with a pickup according to the invention.

The carrier, being an ensemble of rigidly connected elements, does not preclude that typically the pickup as a whole, including a carrier, suspension wires and an actuator, is movable and is being moved, so that all storage locations on the medium can be accessed, in a direction orthogonal to information tracks on the storage medium. In this, accessing shall encompass reading access for reading information from the storage medium, or writing access for writing or recording information onto the storage medium, or combinations of reading and writing access.

One possible form of moving storage media is disks carrying concentric circular or spiral information tracks, with the access being of reflective type where an access light beam is being generated and focused onto the information track and a reflected light beam coming back from and being modulated by the information track is being focused onto a photo detector arrangement and being evaluated. However, it is within the scope of this invention to be used on other forms of optical recording medium having information tracks in layers, like those in card or tape form; and regardless whether the access principle is of a reflective or of a transductive type.

BRIEF DESCRIPTION OF THE DRAWINGS

The invention will be explained in more detail using one embodiment, illustrated in FIGS. 1 to 6.

In the figures.

DETAILED DESCRIPTION OF AN EMBODIMENT OF THE INVENTION

With reference to the figures, according to the invention a pickup P for accessing moving storage media, namely a disk D, has a carrier C with a base 1 and a holder 2, an actuator A with a lens 3 and four suspension wires 4 extending from the rear of the carrier C and joining the carrier C and the actuator A.

Figure 1:
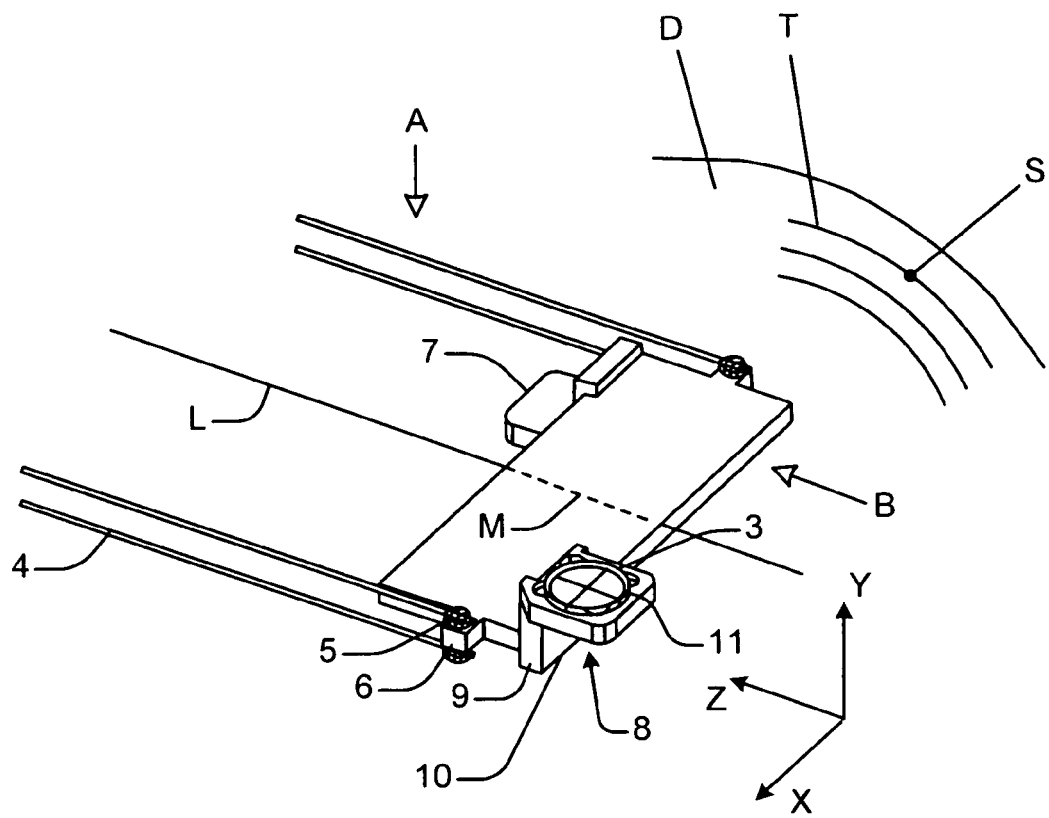
FIG. 1 shows a simplified perspective view of a flat board with a lens of the embodiment of the invention.
Figure 2:
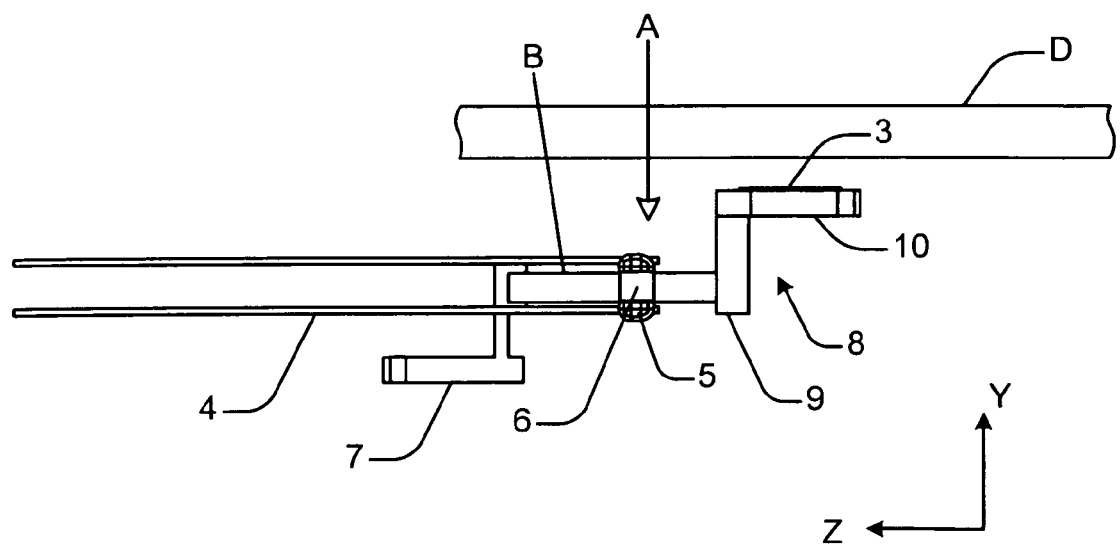
FIG. 2 shows a simplified side view of the flat board.
Figure 3:
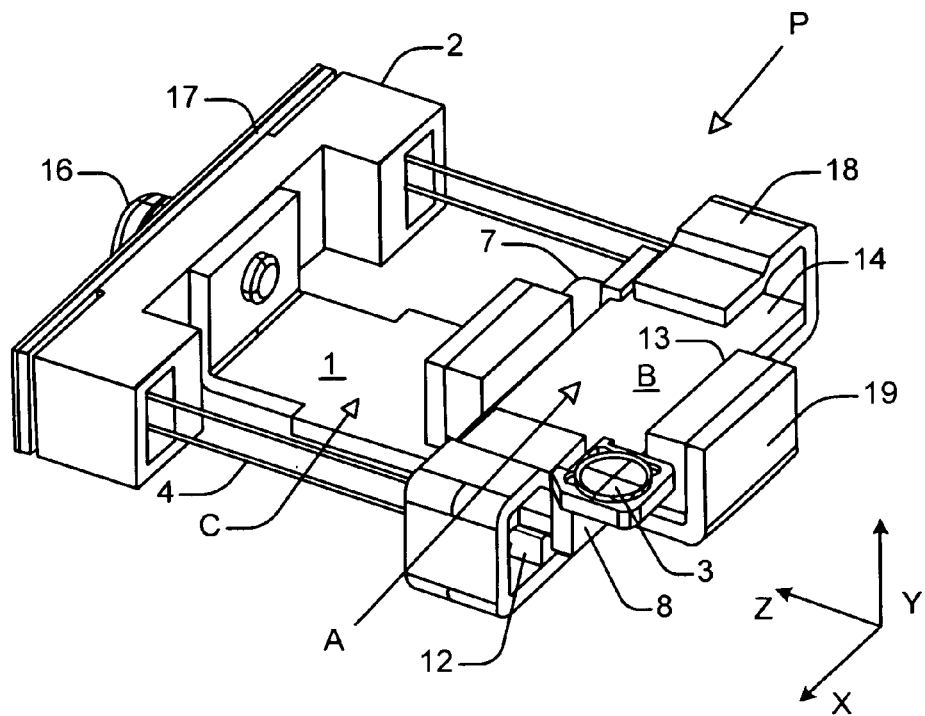
FIG. 3 shows a simplified perspective view of a pickup with the flat board from the top.
Figure 4:
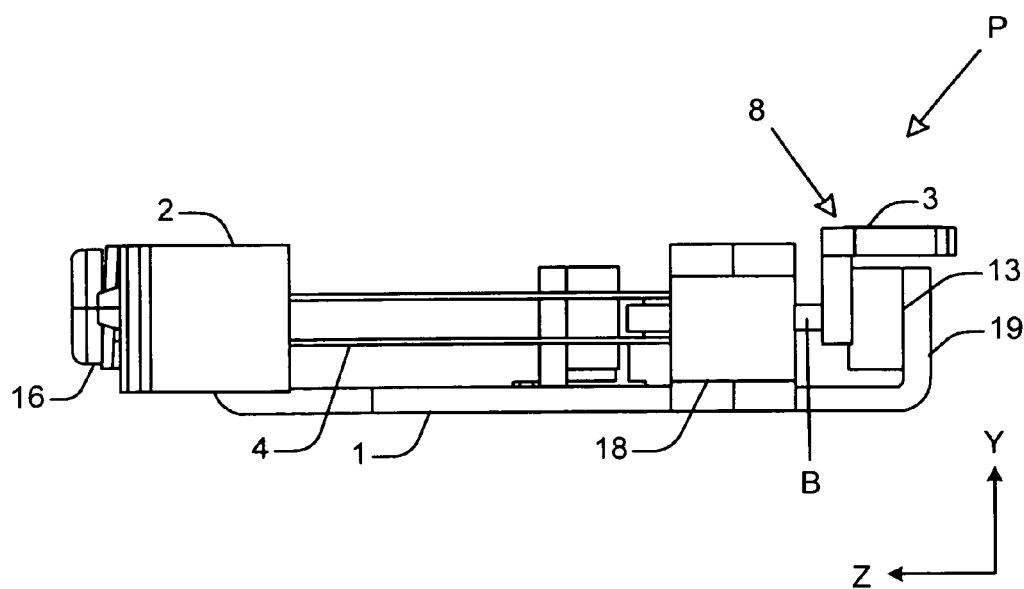
FIG. 4 shows a simplified side view of the pickup.
Figure 5:
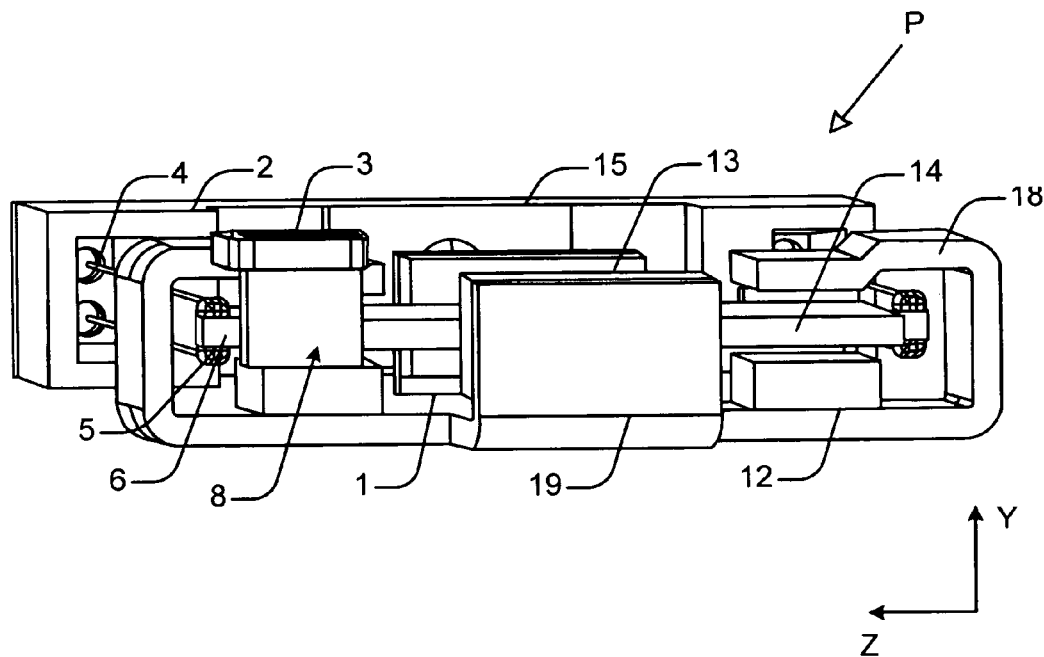
FIG. 5 shows a simplified perspective view of the pickup from the front.
Figure 6:
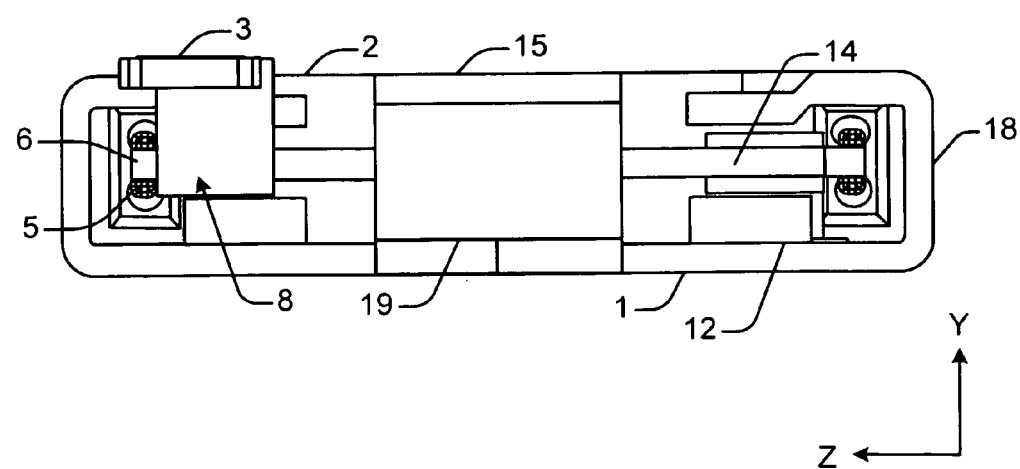
FIG. 6 shows a simplified front view of the pickup.

By means of the suspension with the suspension wires 4, the actuator A with the lens 3 is able to perform focus motion in a focus direction Y orthogonal to the disk D carrying substantially circular information tracks T shown in FIG. 1 with very enlarged, disproportionate distance. Additionally, the actuator A is able to perform tracking motion in a tracking direction X parallel to the surface of the disk D and orthogonal to the information tracks T. Additionally, the actuator A is able to perform so-called radial tilt motion by rotating around an information direction Z which is parallel to the direction of the tracks T, namely to the tangent to the information tracks T at a scanning spot S.

The actuator A comprises a flat board B, which is arranged orthogonal to the focus direction Y and which carries the lens 3. The suspension wires 4 are arranged parallel and orientated in the information direction Z. They are arranged symmetrically with respect to the flat board B. Two suspension wires 4 end at each of two opposite sides in the tracking direction X of the flat board B. The two suspension wires 4 are arranged on top of each other in the focus direction Y, at each side of the flat board B and are soldered with one end to the flat board B by soldering points 5. The flat board B has a substantially rectangular shape and comprises a small projection 6 in the middle of each of its opposite sides in the tracking direction X. The soldering points 5 of the two corresponding suspension wires 4 are located at the top and bottom of each of the two projections 6.

According to the invention the lens 3 is arranged asymmetrically in reference to an axis L parallel to the information direction Z through a center M of the flat board B while the lens 3 and a counter weight 7 are symmetrically arranged in reference to the center M. In particular, the lens 3 is arranged at a front corner of the flat board B, namely a corner at the front of the flat board B, which is opposite to the rear of the carrier C. The lens 3 is connected to the flat board B by a coupling element 8. The coupling element 8 has the shape of a right angle, of which one side 9 extends orthogonal to the information direction Z and of which another side 10 extends orthogonal to the focus direction Y. The side 9 is connected to the flat board B with its bottom edge while the side 10, which has an opening 11 for the lens 3, extends in front of, from and above the flat board B. The counter weight 7 is arranged at the opposite rear corner of the flat board B, e.g. at the corner located at the end of a diagonal from the lens 3 through the center M of the flat board B. The shape, the weight and the arrangement of the counter weight 7 corresponds to that of the coupling element 8 with the lens 3 in a way that the counter weight 7 extends behind, from and under the flat board B.

The flat board B carries tracking coils and focus coils, which are not shown in the figures, on its upper side. In particular, the flat board B is constituted by a printed circuit board.

The pickup P has a magnet configuration, which is connected to the carrier C with two tracking magnets 12 and with two focus magnets 13. The tracking magnets 12 are arranged at opposite sides of the flat board B in the tracking direction X and extend under the flat board B orthogonal to the focus direction Y. The two focus magnets 13 are arranged in front of and behind the flat board B and extend orthogonal to the direction of the tracks T.

The flat board B is arranged with its longer sides, which extend parallel to the tracking direction between the focus magnets 13, while the flat board B projects from the focus magnets 13 at both sides with side parts 14. The longer sides constitute the front and the rear of the flat board B. The lens 3 is arranged in front of one of the side parts 14 next to the front focus magnet 13. The tracking magnets 12 are arranged in the region of the side parts 14 of the flat board B. The tracking magnets 12 and the focus magnets 13 are arranged on the base 1 of the carrier C.

The base 1 extends in a plane orthogonal to the focus direction Y and parallel to the disk D, i.e. in the plane spanned by the tracking direction X and the information direction Z. The holder 2 is connected to a strap 15 of the base 1 by as screw 16. The holder 2 comprises a second printed circuit board 17 with soldering points for the other ends of the suspension wires 4. The second printed circuit board 17 is located behind the actuator A, in other words, at that side of the holder 2 which is opposite to the flat board B. The holder 2 is constituted by a damping block with a damping material inside, which damps the suspension wires 4 extending through the holder 2.

The base 1 of the carrier C comprises two arms 18, of which each extends under the flat board B in the region of the side part 14, extends around the side part 14 with the projection 6 with the soldered ends of the suspension wires 4 and extends above the flat board B orthogonal to the focus direction Y. The arms 18 constitute yokes for the tracking magnets 12. A gap between the flat board B and the upper part of the arms 18 has a certain width to enable e.g. focus movements of the actuator A.

The base 1 of the carrier C comprises two additional elements 19 which extend orthogonal to the base 1, a shape of which corresponds to the shape of the focus magnets 13. Each of the elements 19 faces one of the focus magnets 13 on its side opposite to the flat board B. The elements 19 constitute yokes for the focus magnets 13.

As an alternative, the flat board B carries attached tracking coils and focus coils.

A pickup P according to this invention can be used in the so-called slide or sled design of optical media drives, where it is shiftably fitted to a frame structure of the drive, with appropriate linear driving means for realising the shift, such as linear motors or a motor driven threaded rod. Alternatively, the pickup P according to this invention is also usable in the so-called swivel arm design, where it is pivotably mounted on the end of an arm having a pivoting axis parallel to the focus direction. In that way, the pickup P is movable across the tracks T on the surface of the disk D along an arc which has its main extension in the tracking direction X.

The invention claimed is:

1. A pickup for accessing moving storage media carrying substantially parallel information tracks, comprising:
    a carrier, an actuator with a lens and suspension wires extending from a rear of the carrier and joining the carrier and the actuator, the actuator movable in a focus direction and in a tracking direction and having a substantially rectangular flat board carrying the lens and a counter weight, the flat board arranged orthogonal to the focus direction and carrying tracking and focus coils,
    a magnet configuration connected to the carrier with at least two tracking magnets arranged, in the tracking direction at opposite sides of the flat board and extending orthogonal to the focus direction above and/or under the flat board and with at least two focus magnets arranged in front of and behind the flat board and extending orthogonal to the direction of the tracks,
    wherein the lens is arranged asymmetrically in reference to an axis through a center of the flat board parallel to the direction of the tracks, while the lens and the counter weight are symmetrically in reference to the center of the flat board, wherein, in the tracking direction, at least part of the lens is arranged farther away from the center of the flat board than the tracking and focus coils.

2. A pickup according to claim 1, wherein longer sides of the flat board are arranged between the focus magnets parallel to the tracking direction,
    wherein the flat board comprises two side parts projecting from both ends of the focus magnets in the tracking direction, and
    wherein the lens is arranged in front of one of the side parts, next to the focus magnet arranged in front of the flat board.

3. A pickup according to claim 2, wherein the tracking magnets are arranged in a region of the side parts of the flat board.

4. A pickup according to claim 3, wherein the tracking magnets are arranged on a base of the carrier and where side arms of the base are arranged over the flat board constituting yokes for the tracking magnets.

5. A moving storage media drive having a pickup according to claim 1.

\* \* \* \* \*